(12) United States Patent
Pollock et al.

(10) Patent No.: US 9,676,086 B2
(45) Date of Patent: Jun. 13, 2017

(54) TORQUE TOOL WITH SYNCHRONOUS RELUCTANCE MOTOR

(75) Inventors: Charles Pollock, Oakham (GB); Helen Pollock, Oakham (GB)

(73) Assignee: Norbar Torque Tools Ltd., Oxfordshire (GB)

( * ) Notice: Subject to any disclaimer, the term of this patent is extended or adjusted under 35 U.S.C. 154(b) by 672 days.

(21) Appl. No.: 14/117,511

(22) PCT Filed: May 28, 2012

(86) PCT No.: PCT/GB2012/051200
§ 371 (c)(1),
(2), (4) Date: Nov. 13, 2013

(87) PCT Pub. No.: WO2012/164276
PCT Pub. Date: Dec. 6, 2012

(65) Prior Publication Data
US 2014/0231116 A1 Aug. 21, 2014

(30) Foreign Application Priority Data

May 27, 2011 (GB) .................................. 1108995.0

(51) Int. Cl.
*B23Q 5/00* (2006.01)
*B25B 23/147* (2006.01)
(Continued)

(52) U.S. Cl.
CPC ............ *B25B 23/147* (2013.01); *B25B 21/00* (2013.01); *H02K 7/145* (2013.01); *H02K 19/103* (2013.01)

(58) Field of Classification Search
CPC . B25F 5/00; B25F 5/001; B25B 21/00; B25B 21/02; B25B 23/147
(Continued)

(56) References Cited

U.S. PATENT DOCUMENTS 3,956,678 A * 5/1976 Byrne .................... H02K 1/246
310/168
4,306,164 A * 12/1981 Itoh ........................ H02K 37/10
310/112
(Continued)

FOREIGN PATENT DOCUMENTS

DE 33 24 333 A1 1/1985
EP 2169805 A 3/2010
(Continued)

OTHER PUBLICATIONS

International Search Report for corresponding International Application No. PCT/GB2012/051200 mailed Oct. 24, 2013.
(Continued)

*Primary Examiner* — Robert Long
(74) *Attorney, Agent, or Firm* — Renner, Otto, Boisselle & Sklar, LLP (57) ABSTRACT

A torque tool includes an electrical machine drive system, an electronic controller and a gear system. The drive system includes a rotor and a stator. The rotor includes a pattern of regions of relatively high magnetic permeability interspersed with regions of relatively low magnetic permeability extending generally parallel to the motor shaft such that there is a plurality of magnetic poles distributed circumferentially around the motor shaft. The stator includes electrical windings dispersed in slots disposed around an inner surface of the stator, the slots extending generally parallel to the motor shaft such that, when current flows in the windings, a stator magnetic field generated by the current has the same number of magnetic poles as the rotor. The electronic controller is configured to control the current flow in the stator windings to cause the stator poles to rotate in synchronism with rotation of the motor.

22 Claims, 6 Drawing Sheets

(51) Int. Cl.
  *B25B 21/00* (2006.01)
  *H02K 7/14* (2006.01)
  *H02K 19/10* (2006.01)

(58) Field of Classification Search
  USPC .................................... 173/1–11, 176–183
  See application file for complete search history.

(56) References Cited

U.S. PATENT DOCUMENTS

| | | | | |
|---|---|---|---|---|
| 4,529,900 A * | 7/1985 | Uzuka | ...................... | H02K 7/20 310/266 |
| 4,639,626 A * | 1/1987 | McGee | ................... | H02K 21/38 310/155 |
| 5,181,148 A * | 1/1993 | Blanchette | ............... | H02K 7/14 360/99.08 |
| 5,256,923 A * | 10/1993 | Bartos | .................... | H02K 29/14 310/106 |
| 5,345,131 A * | 9/1994 | Torok | ..................... | H02K 19/06 310/181 |
| 5,432,644 A * | 7/1995 | Tajima | ................... | G11B 19/20 310/156.26 |
| 6,066,904 A | 5/2000 | Fei et al. | | |
| 6,196,332 B1 * | 3/2001 | Albert | ..................... | B25B 21/00 173/176 |
| 6,313,560 B1 * | 11/2001 | Dooley | .................... | H02K 1/02 310/113 |
| 6,320,286 B1 | 11/2001 | Ramarathnam | | |
| 6,672,402 B2 * | 1/2004 | Ortt | ........................... | B25F 5/02 173/1 |
| 6,700,272 B1 * | 3/2004 | Lindner | ................... | H02K 1/12 310/166 |
| 6,788,020 B1 * | 9/2004 | Pollock | ..................... | H02P 1/16 318/599 |
| 7,064,462 B2 | 6/2006 | Hempe et al. | | |
| 7,521,826 B2 | 4/2009 | Hempe et al. | | |
| 7,640,648 B1 * | 1/2010 | Rittenhouse | ............ | H02K 1/145 29/596 |
| 8,278,803 B2 * | 10/2012 | Lin | .......................... | H02K 5/15 310/402 |
| 8,564,148 B1 * | 10/2013 | Novak | ..................... | H02K 7/183 290/44 |
| 8,893,868 B2 * | 11/2014 | Kennedy | ................. | F16D 37/02 192/21.5 |
| 2001/0011877 A1 * | 8/2001 | Lelkes | ..................... | H02P 1/46 318/700 |
| 2003/0107278 A1 | 6/2003 | Agnes et al. | | |
| 2003/0163924 A1 * | 9/2003 | Hempe | ................... | B23D 45/16 30/388 |
| 2004/0041485 A1 * | 3/2004 | Horber | ................... | H02K 21/16 310/156.43 |
| 2005/0057045 A1 * | 3/2005 | Thomas | ............... | H02K 7/1846 290/1 R |
| 2005/0140241 A1 * | 6/2005 | Petersen | ................ | H02K 16/04 310/44 |
| 2005/0156475 A1 * | 7/2005 | Ramu | ................... | H02K 19/103 310/166 |
| 2006/0108890 A1 * | 5/2006 | Hauger | ..................... | H02K 1/16 310/214 |
| 2007/0052304 A1 * | 3/2007 | Masson | ................... | H02K 55/04 310/52 |
| 2008/0088135 A1 * | 4/2008 | Novo Vidal | .......... | F03B 13/083 290/54 |
| 2009/0133894 A1 * | 5/2009 | Mizuhara | ................ | B25B 21/02 173/217 |
| 2009/0160391 A1 * | 6/2009 | Flynn | ..................... | H02K 21/44 318/701 |
| 2010/0072832 A1 * | 3/2010 | Zhu | ........................ | H02K 21/44 310/49.46 |
| 2010/0101781 A1 * | 4/2010 | Scholz | ................... | E21B 4/006 166/244.1 |
| 2010/0123359 A1 * | 5/2010 | Nishikawa | ............... | B25B 21/00 310/50 |
| 2010/0123426 A1 * | 5/2010 | Nashiki | ................... | H02K 1/12 318/701 |
| 2010/0170741 A1 * | 7/2010 | Yamashita | ............. | H02K 21/44 180/443 |
| 2010/0259112 A1 * | 10/2010 | Chung | ................... | H02K 16/00 310/12.18 |
| 2011/0181135 A1 * | 7/2011 | Pollock | ................ | H02K 19/103 310/49.46 |
| 2012/0279736 A1 * | 11/2012 | Tanimoto | ................ | B25B 21/02 173/2 |
| 2012/0318550 A1 * | 12/2012 | Tanimoto | ............ | B25B 23/1475 173/117 |
| 2013/0133910 A1 * | 5/2013 | Riedl | ..................... | B25D 16/00 173/109 |
| 2014/0062267 A1 * | 3/2014 | Pollock | ................... | H02P 25/08 310/68 D |
| 2015/0034294 A1 * | 2/2015 | Miles | ..................... | E21B 47/122 166/66.5 |
| 2015/0372575 A1 * | 12/2015 | Curiac | ................... | H02K 17/16 310/208 |
| 2016/0067855 A1 * | 3/2016 | Grygorczuk | ........... | H02K 33/02 173/117 |

FOREIGN PATENT DOCUMENTS

| | | |
|---|---|---|
| GB | 2 333 906 A | 8/1999 |
| JP | 2002-095227 A | 3/2002 |
| WO | WO 03/066262 A2 | 8/2003 |

OTHER PUBLICATIONS

Written Opinion for corresponding International Application No. PCT/GB2012/051200 dated Oct. 24, 2013.
GB Search Report for GB Application No. GB1108995.0 dated Sep. 28, 2011.

* cited by examiner

TORQUE TOOL WITH SYNCHRONOUS RELUCTANCE MOTOR

This invention relates to the use of an electrical machine in a torque tool.

A torque tool is a tool for applying a controlled torsional moment to mechanical devices such as nuts or bolts, valves, and other rotating systems. Torque tools use a prime-mover, typically rotating at high speed, to drive a torque multiplication gear system which applies torque to the mechanical load. The prime mover may be driven by air pressure, using an air motor, or by hydraulic pressure. In some locations there is a lack of availability of air or hydraulic supply systems and an electrically driven torque tool provides a solution. There are two major problems which generally occur in electrically driven torque tools compared with air-motor driven torque tools.

Electrically driven torque tools require an electric motor which, typically has relatively high inertia compared to an air motor. This high level of inertia leads to excessive torques being applied to the load. In the case of tightening a bolt, for example, the torque seen by the motor rises rapidly as the bolt tightens, causing the motor to decelerate at a high rate. Under such circumstances the motor inertia and the inertia of the drive train will add to the motor torque to tighten the bolt beyond the required torque.

In an air motor the supplied air pressure is very closely related to the air motor's stall torque. A given air pressure results in consistent torque values applied at the load. In an electric motor the relationship between torque values at the load and the supplied electric current to the motor is non-linear. Estimating final torque values at a load is complicated.

Prior art electric torque tools have used brushed motors which are very low cost, can rotate to high speeds and offer attractive power to weight ratios. However, in a brushed motor the rotor has armature windings which add mass to the rotor, increasing its inertia and subsequent torque overshoot at the load. The armature windings are energised through carbon brushes which are mechanical parts and have a limited lifetime.

Other prior art torque tools have addressed the problems of the high inertia of the rotor by using a brushless permanent magnet motor. This provides an electronically commutated motor with a small high speed rotor of low inertia. In these electric motors the torque output is not only a function of motor current but is heavily dependent on the temperature of the magnets in the rotor. Brushless permanent magnet motor torque tools, used repetitively, have a significant rise in motor temperature with time. The magnets in the rotor become less effective with temperature, distorting the accuracy of any torque estimation based on motor current. The resultant torque at the load as the operational duty cycle of the torque tool increases becomes less predictable.

A torque tool incorporating a switched reluctance motor was disclosed in U.S. Pat. No. 7,064,462 and U.S. Pat. No. 7,521,826. Switched reluctance motors are electronically commutated motors and have rotors with low inertia. They do not contain magnets, so predicted output torque of the motor can be based on motor current. In a switched reluctance motor designed to rotate in either direction and produce high torque there will be at least three phase windings. Each phase winding in a switched reluctance motor is electrically independent of the other phase windings and has to be controlled independently. The inverter which controls the flow and return of electrical energy to the three phase windings needs to contain a significant amount of capacitive storage energy.

The inverter for a switched reluctance motor is therefore complex, expensive and large in volume. It is often larger than the motor to be used in the torque tool. A switched reluctance motor is therefore generally not suited to a torque tool, where the requirement is to make it as small and light as possible. Switched reluctance motors are also associated with torque ripple and acoustic noise due to the high radial forces present as the rotor rotates.

It is an object of this invention to provide a torque tool which addresses or at least mitigates the problems described above.

In accordance with one aspect of the present invention there is provided a torque tool for applying a controlled torsional moment to a mechanical device. The torque tool comprises an electrical machine drive system, an electronic controller and a gear system. The drive system comprises a rotor and a stator arranged around the rotor. The rotor is attached to a motor shaft and has a pattern of regions of relatively high magnetic permeability extending generally parallel to the motor shaft, interspersed with regions of relatively low magnetic permeability extending generally parallel to the motor shaft such that there is a plurality of magnetic poles distributed circumferentially around the motor shaft. The stator comprises electrical windings dispersed in slots disposed around an inner surface of the stator, the slots extending generally parallel to the motor shaft such that, when current flows in the windings, a stator magnetic field generated by the current has the same number of magnetic poles as the rotor. The electronic controller is configured to control the current flow in the stator windings to cause the stator poles to rotate in synchronism with rotation of the motor. The gear system is mechanically coupled to the motor shaft and is configured to apply the torsional moment to the device.

The rotor therefore needs no electrical windings or magnets and the drive system can operate as a synchronous reluctance motor. Unlike prior art electrically powered torque tools, a torque tool of this type can have low levels of acoustic noise and vibration, can deliver a torque which can be predicted from a simple measurement of the motor currents, can have a compact electronic controller and can produce a torque output which can be accurately controlled by the user, the torque output being substantially independent of motor temperature.

Each region of relatively low magnetic permeability may be a radially extending slot in the rotor. This enables the motor to be of very simple, robust design. Furthermore, each region of relatively high magnetic permeability may be formed by a generally solid, radially extending tooth. Alternatively, some or all of the teeth may include internal slots for flux blocking.

The rotor may have six or fewer, preferably four, poles, in which case the stator magnetic field should have six or fewer, and preferably four, poles. The stator may comprise eighteen or fewer, preferably twelve, slots. It will be appreciated that, for a three phase motor, the stator will have three times as many slots as there are poles on the rotor (so a four-pole rotor will be used in conjunction with a twelve-slot stator, for example). However, examples can also be envisaged for a two or four phase motor, where the relationship between the number of stator slots and rotor poles will need to be adjusted accordingly.

Each slot may contain windings carrying current of at least two different phases. This makes it possible for the coil pitch of the electrical windings to be less than the pitch of the magnetic poles of the stator. This in turn reduces the space occupied by the windings at the ends of the motor, reducing the overall size of the motor.

The electronic controller may be configured to provide a generally sinusoidally varying current to the windings.

The rotor may comprise a plurality of laminated sheets, preferably steel, attached to the motor shaft, each sheet being generally perpendicular to a longitudinal axis of the motor shaft and having the pattern of regions of relatively high magnetic permeability circumferentially interspersed with regions of relatively low magnetic permeability.

The electronic controller may include an angle monitor configured to measure the angle turned by the drive system and thereby estimate the angle turned by an output shaft of the gear system and the torque supplied by the gear system. The tool may further comprise means for communicating the angle turned by the output shaft to a user of the tool. A torque monitor may be configured to monitor the current supplied to the drive system and thereby monitor the torque supplied to the drive system and thereby estimate the torque supplied by the gear system. A current controller may be configured to reduce the current supplied to the drive system as the estimated torque supplied by the gear system approaches a target torque of the torque tool in order to prevent the supplied torque exceeding the target torque.

In accordance with another aspect of the present invention there is provided a torque tool comprising a synchronous reluctance motor for driving an output shaft via a gear mechanism.

In a further aspect of this invention a torque tool is disclosed incorporating a synchronous reluctance motor in which the angle turned by the load during operation is estimated and further incorporates a means of communicating the angle turned to the user.

Some preferred embodiments of the invention will now be described by way of example only and with reference to the accompanying drawings, in which.

This invention has particular application when an electrical machine is used to apply an increasing load to a mechanical system. One application is an electrically driven torque tool designed to tighten a nut and bolt assembly, where the objective is to generate a resulting tensional force in the bolt. As the angle turned by a nut relative to a bolt increases, the mechanics of the thread increase the bolt tension. As a result the torque on the electrical machine increases proportionally, causing the electrical machine to slow down towards a stop.

In such applications it is desirable to control the electrical machine to stop when the torque has reached a desired value. Stopping the motor prematurely leaves a bolted joint below the specified torque, risking possible failure of the mechanism or structure.

On the contrary, an over-tightened bolt is dangerous as the increased stress on the components could lead to unexpected failure.

In bolt-tightening applications the rate of rise of torque versus angle depends on many factors including the pitch of the screw threads and the types of material being compressed. The angle turned by the nut relative to the bolt to achieve the desired torque setting may be a few degrees or may be many revolutions. This leads to a very wide range of bolted joint characteristics.

A 'soft' joint may typically require rotation of 360° or more of the nut relative to the bolt for the torque to increase from 10% to 100% of the specified value. The electric motor needs to run at sufficiently high speed on a soft joint so that the time of the joint tightening is not excessive.

In contrast a 'hard' joint could achieve the same increase in torque with the nut turning only 30° relative to the bolt. In a hard joint the time taken for the torque to rise from 10% to 100% will typically be in the region of 100 ms to 500 ms.

The 'hard' joint requires a rapid response from the electric motor. The kinetic energy associated with the inertia of the rotating parts of the system causes additional torque to be applied to the joint during deceleration and after the motor is switched off. Therefore a motor with extremely high torque to inertia is required for this application.

Within this range of joint variables, an electric motor driven torque tool, needs to be able to estimate the torque delivered on the bolt accurately and stop the motor when the torque has reached the correct level at the load.

Figure 1:
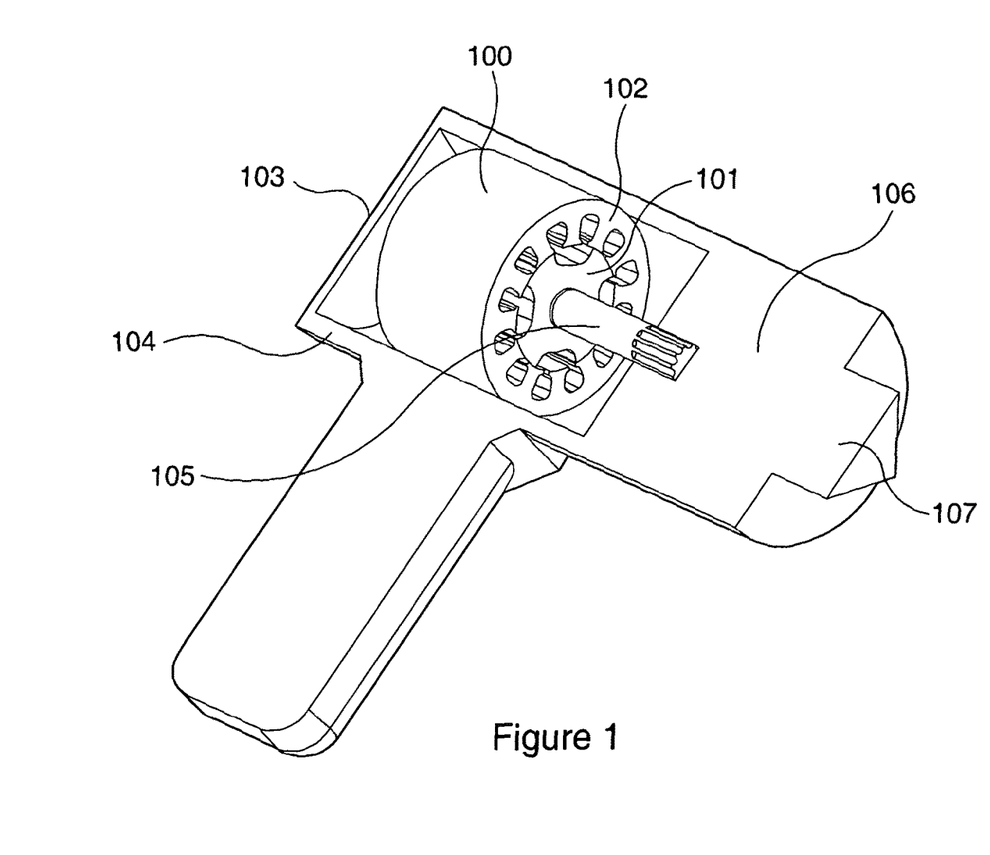
FIG. 1 shows a torque tool incorporating a reluctance motor.

FIG. 1 shows a sketch of a torque tool 103 incorporating a synchronous reluctance motor 100 including a rotor 101 which rotates within a stator 102. The rotor 101 of the motor contains no windings or magnets and therefore has low inertia while also delivering a torque output determined only by the magnitude and timing of the currents in the stator windings. The stator 102 is mounted within a body 104 of the tool and carries stator phase windings (not shown in FIG. 1, and also known as armature windings). The rotor 101 is carried on a motor shaft 105 which acts as an input shaft to a gear system 106. The gear system is shown generically and acts to reduce the motor speed and increase the torque such that a tool output shaft 107 is typically high torque and low speed. The output shaft 107 of a typical torque tool can operate at speeds up to 200 r/min and down to less than 1 r/min with shaft torques ranging from 50 Nm to more than 6000 Nm. The speed of the motor shaft 105 at the input to the gear system 106 is much higher, typically operating in excess of 10,000 rpm, since high motor speeds result in high power to weight ratios. It is attractive to make the motor speed as high as possible subject to the constraints of the additional gear stages and mechanical noise. Since the synchronous reluctance motor has no magnets or windings on the rotor shaft, speeds up to and in excess of 100,000 r/min are possible in torque tools of the type shown in FIG. 1, although in practice suitable speeds are usually in the range 1,000-20,000 rpm. The torque tool 103 will also have bearings on the motor shaft (not shown) to allow the rotor 101 to freely rotate within the stator 102. An electronic controller (not shown in FIG. 1) controls the current supplied to the motor.

Figure 2:
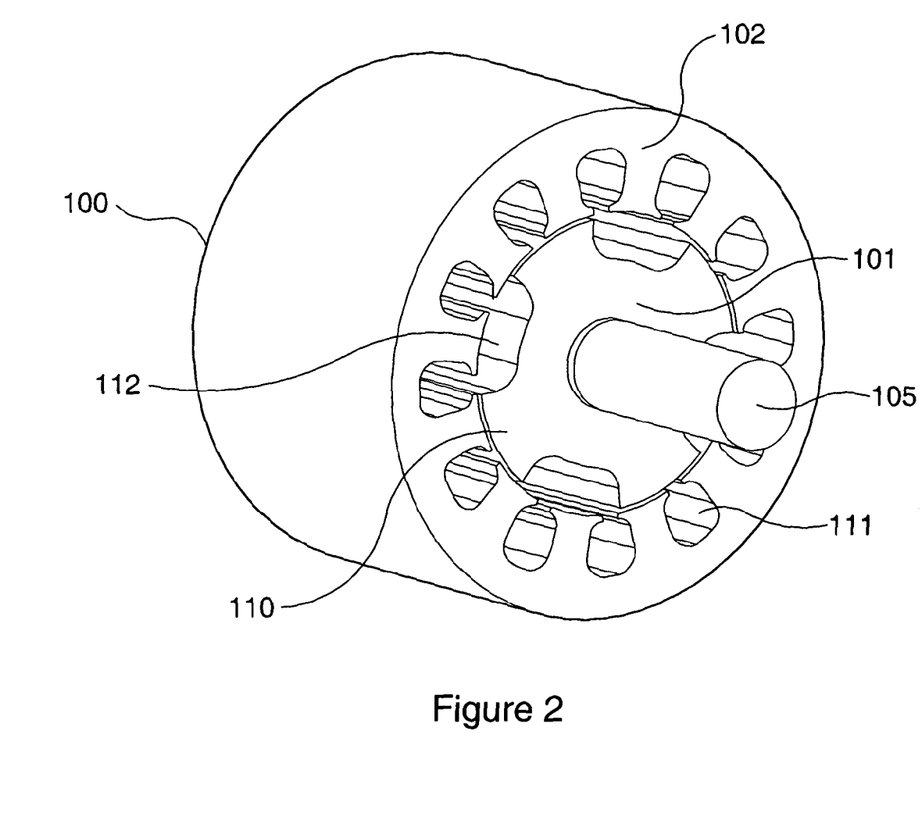
FIG. 2 shows the stator and rotor of a synchronous reluctance motor suitable for use in the torque tool of FIG. 1.

An example of a synchronous reluctance motor 100 which could be used in a torque tool is shown in FIG. 2. The rotor 101 comprises a stack of laminations, usually stamped from sheets of steel, although it will be appreciated that any suitable magnetic material may be used, and indeed it is possible to manufacture a solid rotor, although a laminated construction is usually provided to suppress eddy currents.

The stack of rotor laminations is attached to the motor shaft 105. The rotor laminations shown in FIG. 2 have a pattern with four teeth 110 and four spaces 112. The four teeth 110 form four regions of high magnetic permeability (low reluctance) to a magnetic field extending radially across the gap between stator and rotor. Since the rotor 101 has four teeth, this rotor design is appropriate for a four pole stator field.

The gap between the stator 102 and rotor 101 will typically be smaller than 1 mm, with radial gap lengths of less than 0.5 mm being common.

Stator phase windings (not shown in FIG. 2) are mounted within slots 111, radially directed towards the rotor. The stator phase windings are arranged to provide a four pole magnetic pattern, with the magnetic flux directed across the air-gap between stator and rotor. There are a number of winding arrangements which can create the four pole magnetic pattern, and examples are discussed below. One end of each of the three phase windings are connected together to create a star (or neutral) point. Since the synchronous reluctance motor operates with three alternating currents, it is not necessary to access the star point so only three connections are required between the stator and a power electronic controller (not shown in FIG. 2), which drives alternating current into the stator phase windings. It is also possible to connect the three phase windings of the motor in delta configuration without a star point. The magnitude of the current in the phase windings determines the magnitude of the torque delivered to the motor output shaft. The frequency of the current determines the speed of rotation of the magnetic field, and hence the speed of rotation of the rotor, since the rotor locks into the four pole magnetic field of the stator and rotates in synchronism with the stator field.

FIG. 2 illustrates a suitable stator design which has twelve slots 111 to carry the stator phase windings. Since the rotor 101 has four poles it is also important to configure the stator phase winding with four poles. This means that there are three stator slots 111 per pole for the arrangement of FIG. 2. If each phase winding is pitched over a full pole pitch, then there is one slot per phase per pole. In this case suitable phases of the conductors in each slot are as shown in Table 1:

TABLE 1

Conductors in a twelve slot stator with phase coils pitched over a full pole pitch

| Slot | 1 | 2 | 3 | 4 | 5 | 6 | 7 | 8 | 9 | 10 | 11 | 12 |
|---|---|---|---|---|---|---|---|---|---|---|---|---|
| Phase | U+ | W− | V+ | U− | W+ | V− | U+ | W− | V+ | U− | W+ | V− |

Figure 3:
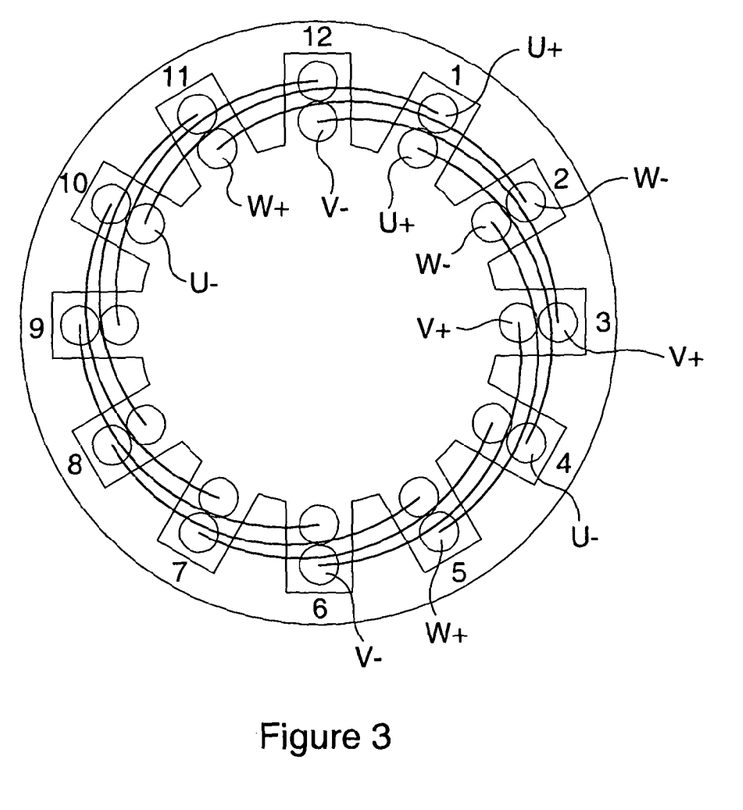
FIG. 3 is a schematic illustration of a suitable winding for a synchronous reluctance motor.

The stator winding in Table 1 is illustrated in FIG. 3. By ensuring that each coil spans a full pole pitch, the conductors in each slot are all from one phase. However, this has the disadvantage that the overlapping phase coils at each end of the motor add considerable length to the motor.

In order to reduce the length of the motor and to shorten the length of the end windings, it is also possible to configure the phase coils of a synchronous reluctance motor suitable for a torque tool by using a coil pitch which is only two-thirds of a pole pitch. In this case a two layer winding is created with conductors from more than one phase sharing the same slots. Suitable phases for the conductors in each slot are shown in Table 2:

TABLE 2

Conductors in a twelve slot stator with phase coils pitched over two-thirds of a pole pitch

| Slot | 1 | 2 | 3 | 4 | 5 | 6 | 7 | 8 | 9 | 10 | 11 | 12 |
|---|---|---|---|---|---|---|---|---|---|---|---|---|
| Layer 1 | U+ | W− | V+ | U− | W+ | V− | U+ | W− | V+ | U− | W+ | V− |
| Layer 2 | V− | U+ | W− | V+ | U− | W+ | V− | U+ | W− | V+ | U− | W+ |

Figure 4:
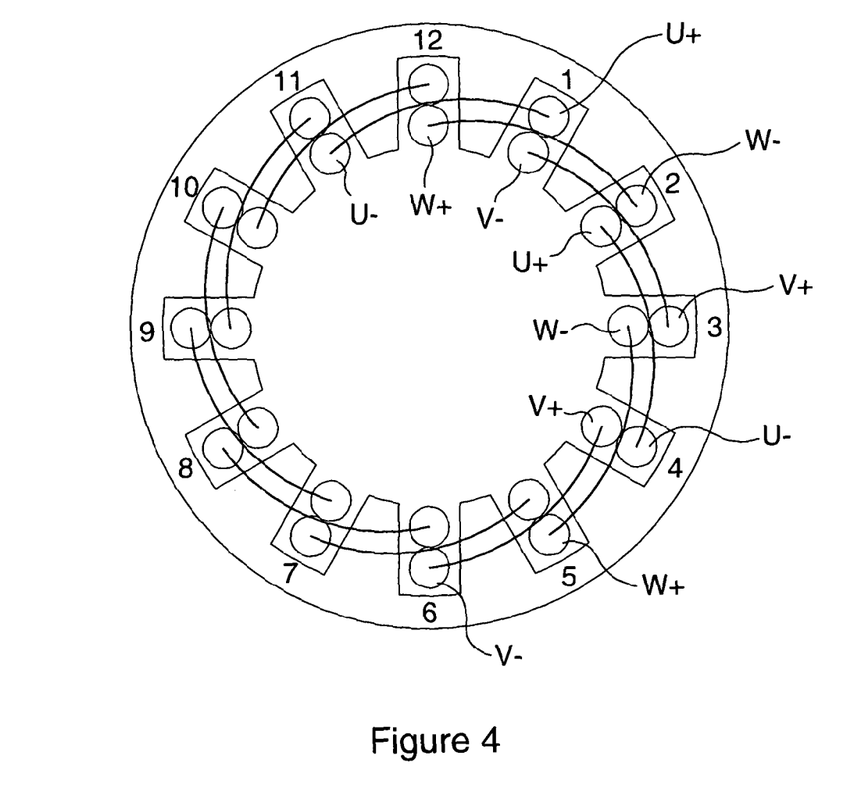
FIG. 4 is a schematic illustration of an alternative winding for a synchronous reluctance motor.

The winding in Table 2 is illustrated in FIG. 4. This shortened pitch winding has the advantage that the turns at each end of the motor only have to pass over one slot before returning down the other side of the coil pitch For example, it will be noted that V+ in layer 1 (slot 3) is only two slots away from V− in layer 2 (slot 1). The winding of Table 2, FIG. 4, therefore has a lower volume of end windings compared to the winding of Table 1, FIG. 3, and this makes it possible to reduce the overall size of the motor, which is desirable in a torque tool. The coil pitch in the winding illustrated in FIG. 4 is 66% of the stator pole pitch.

In prior art synchronous reluctance motors the stator would typically have had 24 or 36 slots. In a 4 pole machine with 24 slots, the pole pitch spans 6 stator slots. It is common in such motors to short pitch the stator coils by one stator tooth. The coil pitch is then ⅚ or 83% of the full pole pitch. It is not common however, to shorten the pitch to as low as 66% of the pole pitch. It would be expected that such a significant shortening of the pitch of the stator coils would produce a significant reduction in coil flux linkage and hence torque output. However, a torque tool incorporating a synchronous reluctance motor with fewer than expected stator teeth and shorter than expected coil pitch can be designed to deliver the desired reduction in the volume of end windings with a relatively small reduction in torque per amp. This is achieved by the use of a salient pole rotor as shown in FIG. 2.

It should be noted that a rotor of a simple salient pole structure, such as that shown in FIG. 2, is not normally considered suitable for a synchronous reluctance motor. Problems normally associated with such pole structures include a high variation in torque as the rotor rotates (known as "torque ripple"). However it has been found that, surprisingly, when the rotor of FIG. 2 is used in conjunction with the winding of Table 2, this simple salient pole structure mitigates some of the expected disadvantages of the shorter coil pitch.

A torque tool can therefore benefit from the use of a synchronous reluctance motor with its low inertia. The shorter pitch winding of Table 2 can deliver lower volume end windings, and a rotor of the type shown in FIG. 2 can be formed from simple stamped laminations which are extremely easy to manufacture at low cost. A further advantage of a torque tool incorporating this design of synchronous reluctance motor is that the simple lamination structure of the rotor in FIG. 2 is very robust against radial forces. This is important when the rotor rotates at high angular velocities. In order to achieve high power to weight it is advantageous to have a rotor which can rotate at high angular velocity. The rotor design of FIG. 2 is very strong, limited only by the yield strength of the laminated steel. This is in contrast to prior art designs of synchronous reluctance motor in which axial laminated structures are used to maximise the ratio of direct axis and quadrature axis permeances. Such rotor constructions are not suited to high speed machines.

A still further advantage of the rotor in FIG. 2 is that the rotor inertia is lower than other more common rotor designs for synchronous reluctance motors. This results from the use of the solid teeth shown in FIG. 2. The problem of torque ripple in synchronous reluctance motors has previously been addressed by incorporating "flux barriers" into the design. These are usually in the form of air gaps in the teeth.

However, the effect of this is to increase the percentage of steel in the rotor located a long way from the axis. The use of solid teeth provides a short magnetic path between poles and enables more of the steel in the rotor to be located close to the axis. This reduces the moment of inertia of the rotor and enables it to be stopped more quickly as the correct torque is approached, reducing the risk of torque overshoot, and thus providing a particular advantage for use in a torque tool. In the arrangement of FIG. 2, the problem of torque ripple has been addressed by the use of a small number of stator slots (and optionally the reduced pitch winding shown in FIG. 4), removing the need for the flux barriers previously required.

Permanent magnet motors have previously been used in torque tools because of the high power density available. However, it should be noted that rotor designs in permanent magnet motors have reduced mechanical strength and are less suited to high rotational velocities. The permanent magnets either have to be retained by a non-magnetic sleeve or they have to be buried within the rotor laminations. The use of a synchronous reluctance motor operating at high speed addresses the power density issue, and the relationship between torque and current is not temperature dependent in a synchronous reluctance motor, allowing for much more precise control of the torque.

Figure 5:
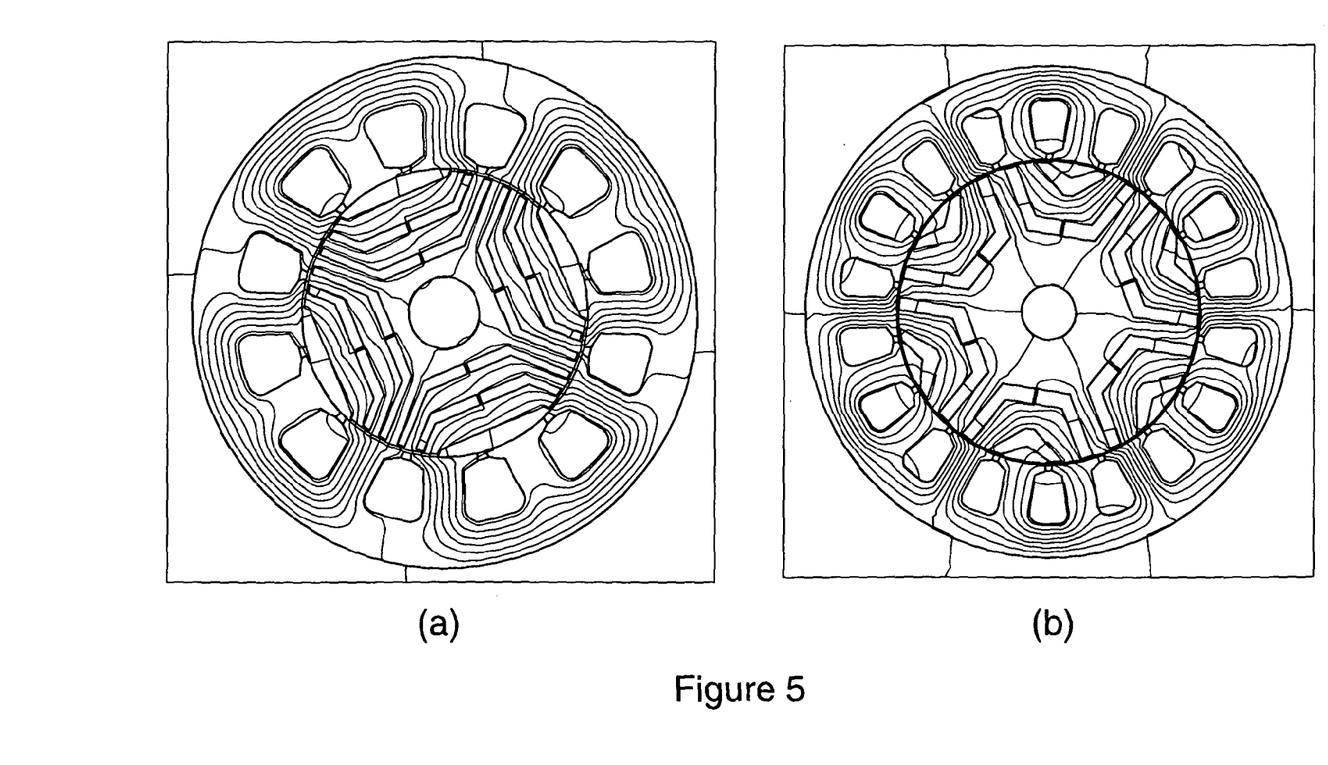
FIG. 5 shows further examples of rotor and stator designs for synchronous reluctance motors which could be used in a torque tool.

Alternative laminated rotor designs are possible in a synchronous reluctance motor in a torque tool. Possible alternative lamination designs are shown in FIG. 5(a) and (b). FIG. 5(a) shows an alternative four pole rotor in which the rotor laminations have additional slots cut within the lamination to reduce the permeance of the lamination in the quadrature (high reluctance) axes. FIG. 5(b) shows a six pole rotor within a six pole stator (18 slots). The rotor in FIG. 5(b) has a cylindrical surface and the paths of high reluctance and low reluctance are created entirely from internal slotting, although as discussed above, these slots effectively increase the moment of inertia of the rotor.

The three phase windings of the synchronous reluctance motor can be connected together in a star or delta configuration. Only three external connections are therefore required between the motor and a power electronic inverter. The power electronic inverter can be standard electronic technology with six power switches operating from a dc voltage. The power electronic inverter operates to alternatively connect the ends of the phase windings to the upper and lower supply voltages in a manner known as pulse width modulation to deliver controlled alternating current to the phase windings of the motor and to therefore control the speed and torque of the motor. Operation of the inverter with minimal losses requires the stator phase currents to maintain synchronism with the rotor position. This can be achieved with sensors on the shaft or with sensorless control.

It will also be appreciated that the examples provided above relate to a three phase motor, but that two or four phase motors are also possible. In a two phase motor, if the rotor has four teeth, the stator will have eight teeth. Rotors with two, three, four, five or six teeth in combination with stators having four, six, eight, nine, ten, twelve, fifteen, sixteen or eighteen slots may all be envisaged.

As previously discussed, the torque tool needs to be able to estimate the torque delivered on the bolt accurately and stop the motor when the torque has reached the correct level at the load. In order to implement this, the torque tool may also contain a system for accurately counting the angle turned by the rotor and hence, through knowledge of the gear ratio, determining the exact angle turned by the load on the output of the gear system. The tool may also incorporate a means of communicating the angle turned to the user. It may also be beneficial to monitor the speed of the motor. As a bolt approaches maximum torque it will be appreciated that the rate of rotation of the bolt will decrease. By monitoring the speed of the motor (and rate of change of speed) and the angle turned, it is possible to ensure that the current supplied to the motor is reduced in time to prevent the motor overshooting as a result of the inertia of the rotor. A dynamic torque calculator may be employed to control the motor torque (i.e. current supplied) to ensure that a target output torque is reached accurately. This is possible because, in a synchronous reluctance motor, the speed of the motor is proportional to the frequency of the current supplied, and the torque supplied by the motor is proportional to the magnitude of the current or a non-linear function of the magnitude (at least in the steady state).

Figure 6:
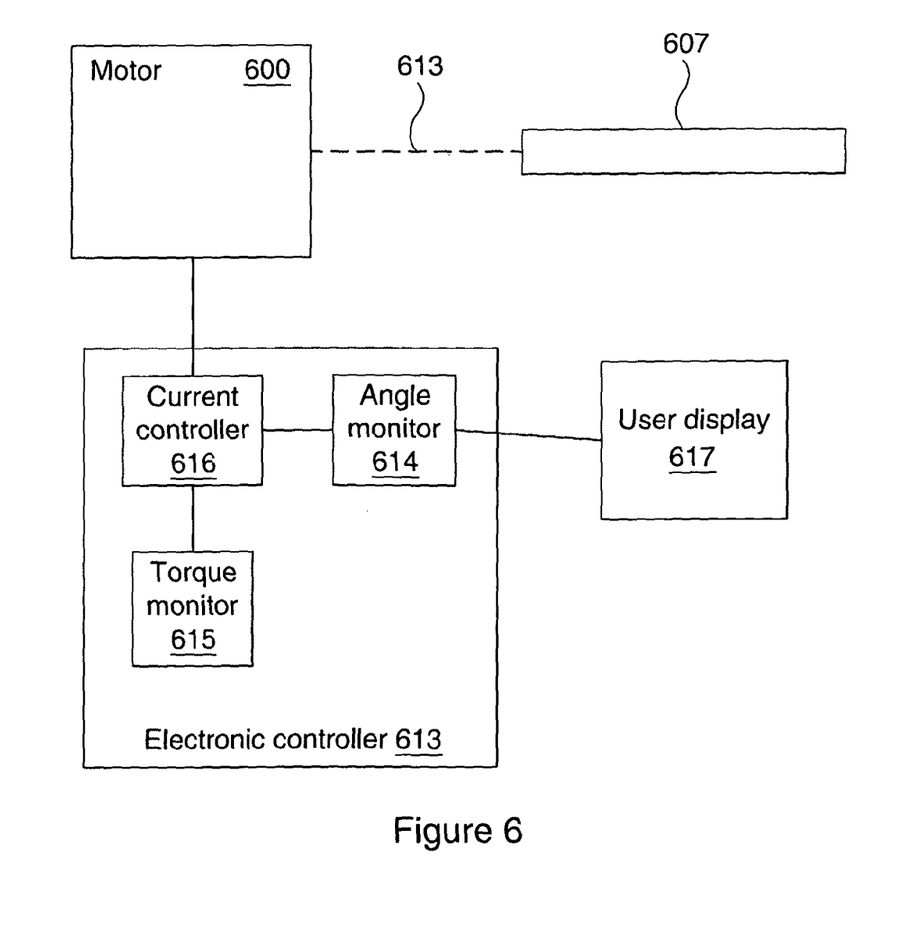
FIG. 6 is a schematic illustration of a torque tool including a control system.

FIG. 6 illustrates schematically how this may be achieved. A motor 600 is coupled via a gear system 613 to an output shaft 607. Current is supplied to the motor 600 by an electronic controller 613. The electronic controller includes an angle monitor 614 which records the number of current cycles supplied to the motor and uses this information to calculate the angle turned by the motor 600 and thus by the output shaft 607. A torque monitor 615 calculates the torque output from the motor from the magnitude of the current supplied to the motor. A dynamic current controller 616 controls the current supplied to the motor, using information supplied by the angle monitor 614 and torque monitor 615. The angle monitor 615 can also measure the speed at which the motor turns. A user display 617 enables the angle turned by the output shaft to be displayed to the user.

A torque tool incorporating a synchronous reluctance motor as described above addresses the limitations of prior art electrically driven torque tools. The absence of any rotor windings delivers two advantages over prior art motors with rotor windings. Firstly the need for carbon brushes and commutator is removed, and secondly the reduced rotor mass delivers a substantial reduction in rotor inertia. This lower inertia results in more rapid stopping when the tool is used with a 'hard' joint and this greatly reduces the torque overshoot which occurs with other torque tools. The rotor of the synchronous reluctance motor used in a torque tool as described has no permanent magnets. It is well known that motors with permanent magnets can deliver high torque to weight and high torque to inertia ratios. However, prior art torque tools with rotors carrying permanent magnets suffer from a major disadvantage which makes them unsuitable for use in a high performance torque tool. The magnetic flux density of the rotor magnets is heavily dependent on temperature. Since the motor torque is also dependent on the magnetic flux, the estimation of torque output of the tool and hence the accurate fastening of any fixture or joint will be dependent on temperature within the motor. This temperature could vary from less than 0° C. in cold ambient temperatures to values in excess of 100° C. when the motor has been operating for some time. Such a temperature range can lead to 30% variation in torque output.

Furthermore, a synchronous reluctance motor in a torque tool can be small, quiet and easy to control. The current can be supplied in a sine wave, rather than in the individual pulses required by a switched reluctance motor, reducing the complexity of the power supply required and the noise of the motor.

Throughout this description the invention has been described with reference to the operation of the synchronous reluctance motor as a motor. Whilst the dominant purpose of the torque tool will be to operate as a motor, there will be times when the energy flow will be reversed and the motor becomes a generator for a short period of time. This is particularly useful when it is required to stop the rotor rapidly ,or example in a hard joint.

It will be appreciated that, although the advantages of a low moment of inertia, small size, high power to weight ratio and simple control mechanism are particularly appropriate for use in a torque tool, the motor described above may also be used in other power tools requiring high speed motors, such as power drills, circular saws, or similar.

The invention claimed is:

1. A torque tool for applying a controlled torsional moment to a mechanical device, comprising:
    an electrical machine drive system comprising a synchronous reluctance motor, the synchronous reluctance motor comprising:
        a rotor attached to a motor shaft, the rotor having a pattern of regions of relatively high magnetic permeability extending parallel to the motor shaft, interspersed with regions of relatively low magnetic permeability extending parallel to the motor shaft in such a way that there is a plurality of magnetic poles distributed circumferentially around the motor shaft; and
        a stator arranged around the rotor and comprising electrical windings dispersed in slots disposed around an inner surface of the stator, the slots extending parallel to the motor shaft such that, when current flows in the windings, a stator magnetic field generated by the current has the same number of magnetic poles as the rotor; and
    an electronic controller configured to control the current flow in the stator windings to cause the magnetic poles of the stator magnetic field to rotate in synchronism with rotation of the motor until the controlled torsional moment has been applied to the mechanical device,
    wherein the drive system further comprises a gear system mechanically coupled to the motor shaft and configured to apply the torsional moment to the device.

2. The torque tool of claim 1, wherein each region of relatively low magnetic permeability is a radially extending slot in the rotor.

3. The torque tool of claim 1, wherein each region of relatively high magnetic permeability is a radially extending solid tooth in the rotor.

4. The torque tool of claim 1, wherein the rotor and stator each have six or fewer magnetic poles.

5. The torque tool of claim 1, wherein the rotor and stator each have four magnetic poles.

6. The torque tool of claim 1, wherein the stator comprises eighteen or fewer slots.

7. The torque tool of claim 1, wherein the stator comprises twelve slots.

8. The torque tool of claim 1, wherein each slot contains windings carrying current of at least two different phases.

9. The torque tool of claim 1, wherein a coil pitch of the electrical windings is less than the pitch of the magnetic poles of the stator.

10. The torque tool of claim 1, wherein the electronic controller includes an angle monitor configured to measure the angle turned by the drive system and thereby estimate the angle turned by an output shaft of the gear system and the torque supplied by the gear system.

11. The torque tool of claim 10, further comprising means for communicating the angle turned by the output shaft to a user of the tool.

12. The torque tool of claim 1, wherein the electronic controller includes a torque monitor configured to monitor the current supplied to the drive system and thereby estimate the torque supplied by the drive system and thereby estimate the torque supplied by the gear system.

13. The torque tool of claim 10, wherein the electronic controller includes a current controller configured to reduce the current supplied to the drive system as the estimated torque supplied by the gear system approaches a target torque of the torque tool in order to prevent the supplied torque exceeding the target torque.

14. The torque tool of claim 1, wherein the rotor comprises a plurality of laminated sheets attached to the motor shaft, each sheet being perpendicular to a longitudinal axis of the motor shaft and having the pattern of regions of relatively high magnetic permeability circumferentially interspersed with regions of relatively low magnetic permeability.

15. The torque tool of claim 1, wherein the rotor has no electrical windings or magnets thereon.

16. The torque tool of claim 1, wherein the rotor is formed from steel.

17. The torque tool of claim 1, wherein the electronic controller is configured to provide a sinusoidally varying current to the windings.

18. The torque tool of claim 1, configured to drive the motor shaft at speeds above about 1,000 rpm.

19. The torque tool of claim 1, configured to drive the motor shaft at speeds up to 100,000 rpm.

20. A torque tool comprising a synchronous reluctance motor for driving an output shaft via a gear mechanism.

21. The torque tool of claim 20, further comprising an angle monitor for measuring an angle turned by the motor and thereby estimating an angle turned by the output shaft.

22. The torque tool of claim 1, configured to drive the motor shaft at speeds above about 10,000 rpm.

* * * * *